(12) United States Patent
Bacon et al.

(10) Patent No.: US 9,127,802 B2
(45) Date of Patent: Sep. 8, 2015

(54) PIPELINE PIG AND LAUNCHING APPARATUS

(75) Inventors: David Colin Bacon, Northallerton (GB); Geoffrey Wilkinson, Stockton On Tees (GB)

(73) Assignee: Pipeline Engineering & Supply Company Limited, Richmond (GB)

( * ) Notice: Subject to any disclaimer, the term of this patent is extended or adjusted under 35 U.S.C. 154(b) by 353 days.

(21) Appl. No.: 13/382,998

(22) PCT Filed: Jul. 16, 2010

(86) PCT No.: PCT/GB2010/051169
§ 371 (c)(1),
(2), (4) Date: Feb. 1, 2012

(87) PCT Pub. No.: WO2011/007182
PCT Pub. Date: Jan. 20, 2011

(65) Prior Publication Data
US 2012/0131758 A1    May 31, 2012

(30) Foreign Application Priority Data
Jul. 16, 2009  (GB) .................................. 0912360.5

(51) Int. Cl.
*F16L 55/38* (2006.01)
*F16L 55/46* (2006.01)

(52) U.S. Cl.
CPC *F16L 55/38* (2013.01); *F16L 55/46* (2013.01)

(58) Field of Classification Search
USPC ................................................... 15/104.061
See application file for complete search history.

(56) References Cited

U.S. PATENT DOCUMENTS 6,596,089 B2 * 7/2003 Smith et al. ....................... 134/8

FOREIGN PATENT DOCUMENTS

| EP | 0859930 A1 | 5/2000 |
| WO | WO-97/17566 A1 | 5/1997 |
| WO | WO-2007/096608 A1 | 8/2007 |
| WO | WO 2007096608 A1 * | 8/2007 |

OTHER PUBLICATIONS

Hutter, Manfred, "International Search Report" for PCT/GB2010/051169, as mailed Mar. 1, 2011, 5 pages.

* cited by examiner

*Primary Examiner* — Monica Carter
*Assistant Examiner* — Stephanie Berry
(74) *Attorney, Agent, or Firm* — Winstead PC

(57) ABSTRACT

The present invention provides a pipeline pig (10) comprising an elongate body (12) and annular front and rear supports (26,30) projecting radially from the body (12). Each support (26,30) has an upstream side and a downstream side, with the front support (26) including at least one first fluid passage (18) permitting fluid flow from the upstream side to the downstream side. and the rear support (30) including at least one second fluid passage (22) permitting fluid flow from the upstream side to the downstream side. The pig further comprises a launch valve (50) adapted to move from an open position to a closed position to close the at least one first fluid passage (18), and a control means adapted to control the closing of the launch valve (50). A launch trap for launching pigs into a pipeline is also provided.

10 Claims, 3 Drawing Sheets

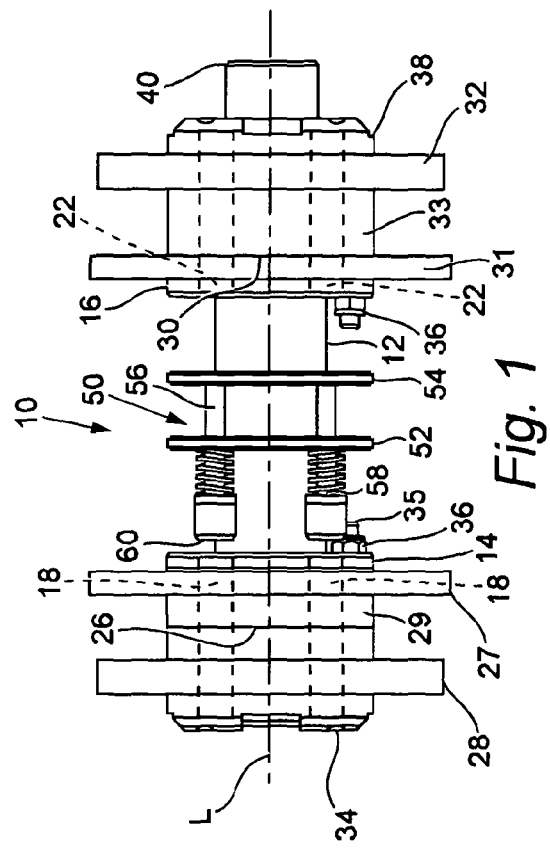
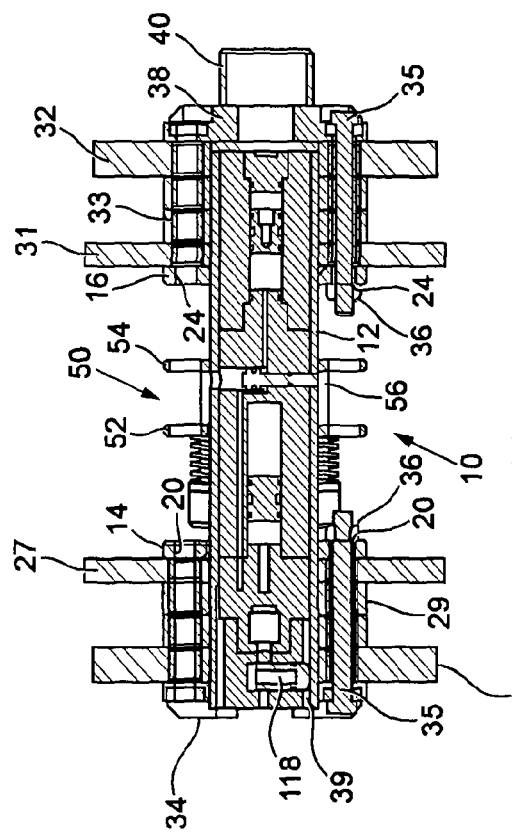
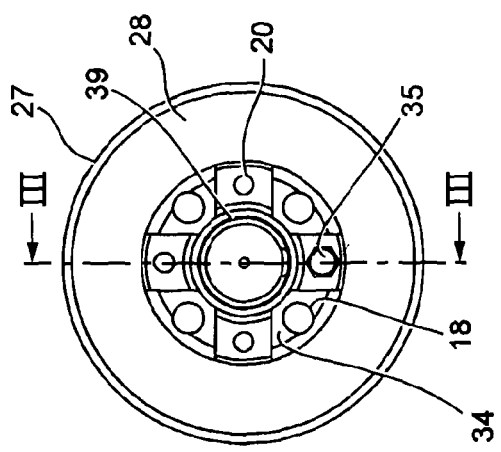

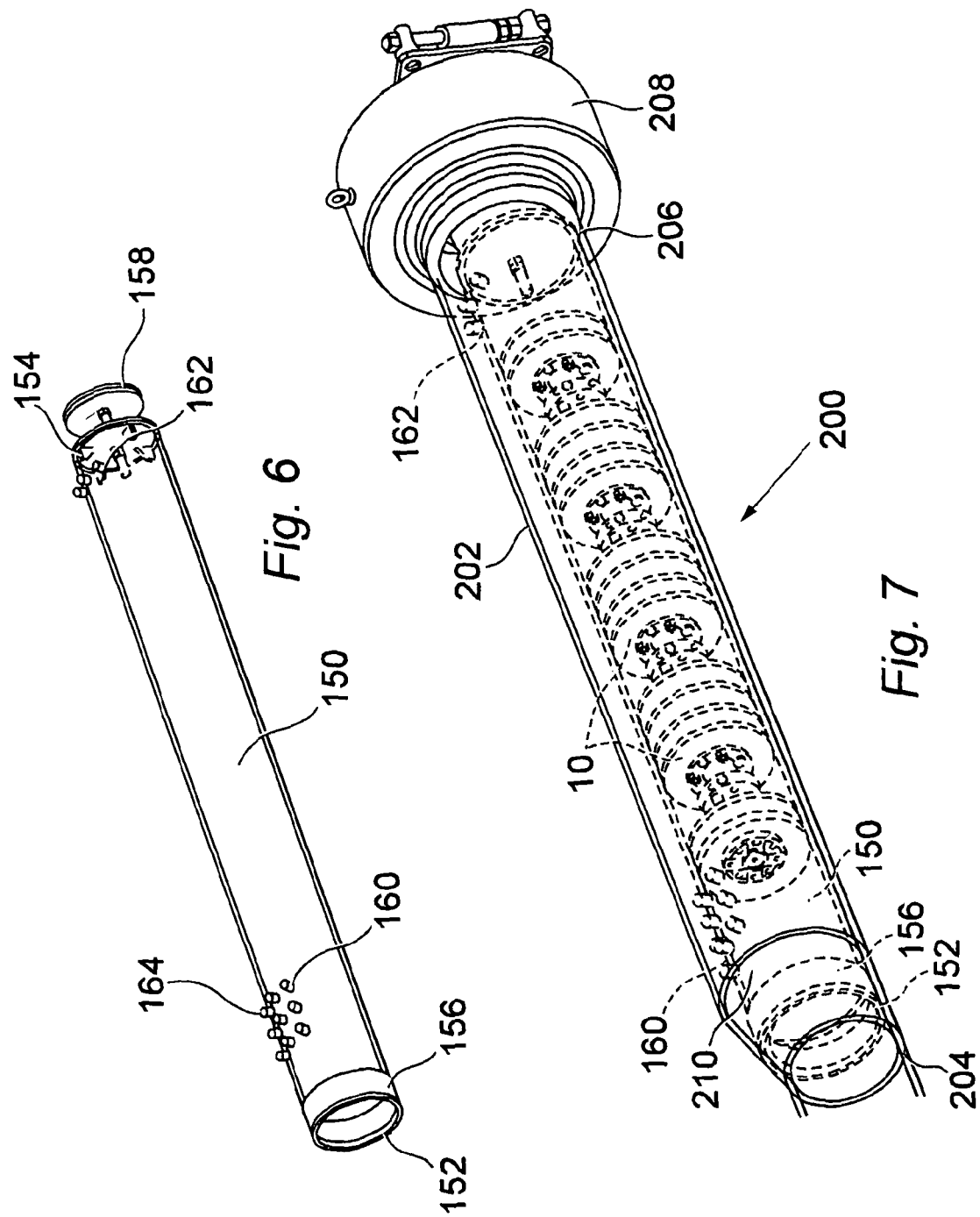

PIPELINE PIG AND LAUNCHING APPARATUS

The present invention relates to the field of pipeline pigging and pipeline pigs. More specifically, the present invention provides a pipeline pig and launch trap which allows automatic and sequential launching of multiple pigs into a pipeline.

WO2007/096608 to the same applicant discloses a pipeline pig which is intended to be introduced into a pipeline as one of a group of identical pigs placed in a launch cassette. To ensure that each pig in the group is launched from the cassette into the pipeline individually rather than collectively, each pig has an internal valve means which controls fluid flow through the body of the pig. The valve means of each pig is adapted so that it can be held open by a projecting member extending into the pig body from an identical pig lying in front in the cassette. As no pig lies in front of the lead pig, the valve in the lead pig is closed and prevents fluid flow therethrough. Each lead pig is launched by the fluid passing through the open valves of the following pigs and acting upon the closed valve in the lead pig. The build up of hydraulic pressure then launches the lead pig into the pipeline. As the projecting member of the lead pig has now left the valve means of the following pig, the valve means in the following pig can now close. The delay between the launch of each pig can be determined by controlling the fluid flow into the cassette, as well as the speed at which the valve means in each following pig closes.

The pigs disclosed in WO'608 are best suited to use in relatively large diameter pipelines. Therefore, there exists a need for an automatically-launching pig for use in smaller diameter pipelines of 6-12 inches (15.25-30.5 cm).

It is an aim of the present invention to provide such a pig.

According to a first aspect of the present invention, there is provided a pipeline pig comprising:
  an elongate body;
  annular front and rear supports projecting radially from the body, wherein each support has an upstream side and a downstream side, the front support including at least one first fluid passage permitting fluid flow from the upstream side to the downstream side, and the rear support including at least one second fluid passage permitting fluid flow from the upstream side to the downstream side;
  a launch valve adapted to move from an open position to a closed position to close the at least one first fluid passage; and
  a control means adapted to control the closing of the launch valve.

The launch valve may comprise a valve body which is slidably engaged with the elongate pig body for moving from the open to the closed position, and a biasing means which biases the valve body towards the closed position, and wherein the control means may comprise a locking member adapted to lock the valve body in the open position against the force of the biasing means.

The first support may include a plurality of circumferentially spaced first fluid passages, wherein the launch valve comprises a valve body and biasing means for each respective first fluid passage.

The launch valve may include an annular base member slidingly located on the exterior of the pig body, wherein each valve body is attached to the base member via a valve stem.

The launch valve may further include an annular guide plate fixed to the exterior of the pig body, the guide plate including a plurality of circumferentially spaced guide apertures within which the valve stems are located. Each biasing means may be a compression spring located on the valve stem between the valve body and the guide plate.

The control means may further comprise a control circuit adapted to selectively actuate the locking member to release the valve body towards the closed position.

The control means may be housed inside the body of the pig, where the locking member projects from the body to lock the valve in the open position.

The control circuit may be a hydraulic control circuit housed in the body of the pig and in fluid communication with the exterior of the body.

The control circuit may comprise a compensator, an accumulator and an actuating piston connected to the locking member;
  wherein the compensator has a first side in fluid communication with the accumulator and a second side in fluid communication with the exterior of the body;
  the circuit further comprising a control valve intermediate the first side of the compensator and the accumulator, the control valve operable between a first position in which fluid may flow in and out of the compensator, and a second position in which fluid may only flow out of the compensator; and
  wherein the actuator piston is in fluid communication with the accumulator such that discharge of the accumulator will actuate the locking member to release the launch valve.

The control valve may include an actuator projecting from a front end of the pig body, and the pig may further comprise a projecting member projecting from a rear end of the pig body, such that when two of the pigs are arranged in-line the projecting member of the front pig acts upon the actuator of the rear pig to hold the control valve of the rear pig in the first position until the front pig has moved away.

The actuator may project radially into an actuation chamber located in the front end of the pig body, and the projecting member may be adapted to locate in the actuation chamber of an adjacent pig.

The actuation chamber may be annular, and the projecting member may be substantially cylindrical.

The first and second supports may each comprise a sealing disc and a guide disc, wherein the sealing disc has a larger diameter than the guide disc. The guide disc may have a greater thickness than the sealing disc. One or both of the first and second supports may also comprise one or more spacer discs located between the sealing disc and guide disc.

According to a second aspect of the invention, there is provided a launch trap for launching pipeline pigs into a pipeline, the trap comprising:
  an elongate body including a first end adapted to be connected to a pipeline, a second end having a sealable loading door therein, and a fluid inlet adapted to be connected to a source of pressurised fluid;
  a removable pig cassette having a first end and a second end, the cassette adapted to hold a plurality of pipeline pigs therein and to be loaded into the elongate body;
  wherein the first end of the cassette is provided with an external seal which contacts an internal surface of the first end of the body to form a seal between the body and the cassette; and
  wherein the first and second ends of the cassette are provided with first and second sets of fluid ports, respectively, which permit fluid communication between the body and the cassette.

The first set of fluid ports may have more ports than the second set.

The cassette may further comprise a plurality of plugs which may be inserted in one or more of the first and/or second ports to block flow through one or more of the first and/or second ports.

Preferred embodiments of the present invention will now be described, by way of example only, with reference to the accompanying drawings, in which:

FIG. 1 is a side view of a pipeline pig;

FIG. 2 is a front view of the pig shown in FIG. 1;

FIG. 3 is a vertical section through the pig along the line III-III shown in FIG. 2;

Figure 5A:
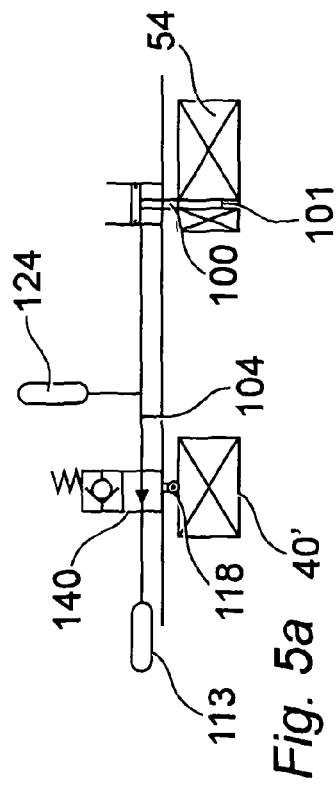
Figure 5B:
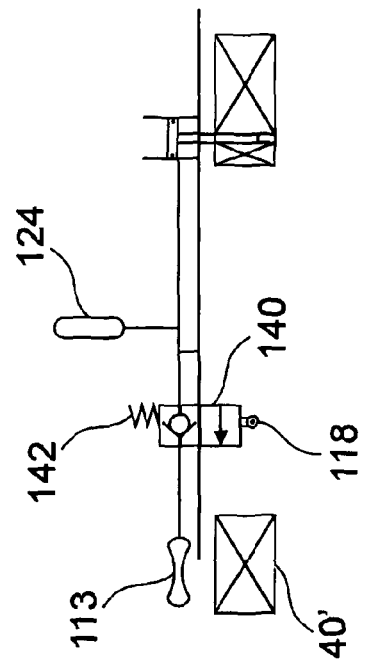
Figure 5C:
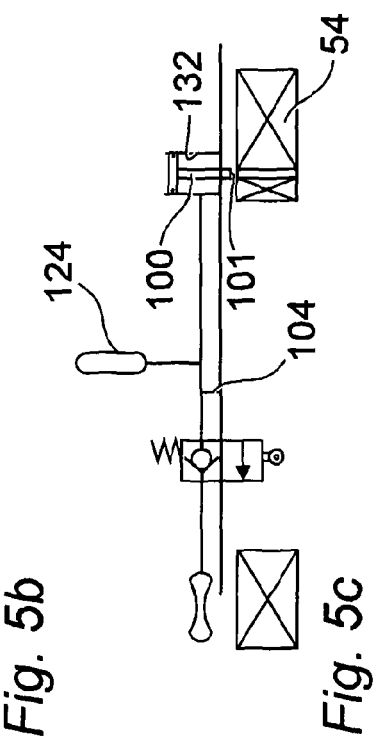
Figure 4:
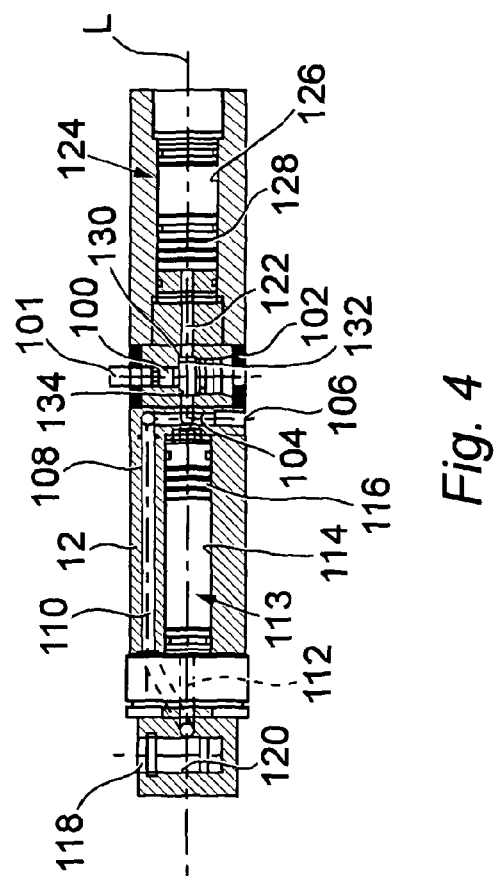
FIG. 4 is a detail section view of a hydraulic control circuit contained within the pig body.

FIGS. 5(a)-(c) show schematic representations of various stages of the operation of the circuit shown in FIG. 4;

FIG. 6 is a projected view of a pig launch cassette; and

FIG. 7 is a projected view of a pig launch trap incorporating the cassette shown in FIG. 6.

FIGS. 1-3 show a pipeline pig, generally designated 10. The pig comprises an elongate and generally cylindrical body 12 having a front end and a rear end. Supported on the body 12 and longitudinally spaced from one another are front and rear mounting flanges 14,16, which project from the body 12 in the radial direction. The front flange 14 is provided with a plurality of first fluid apertures and first fixing apertures which are circumferentially spaced around the front flange 14 and extend through the front flange 14 in the longitudinal direction. The first fluid and first fixing apertures preferably alternate in the circumferential direction around the front flange 14. Similarly, the rear mounting flange 16 has a plurality of second fluid apertures and second fixing apertures which are circumferentially spaced around the rear flange 16 and extend through the rear flange 16 in the longitudinal direction. As with the front flange 14, the second fluid and second fixing apertures preferably alternate in the circumferential direction around the rear flange 16.

Mounted on the front and rear ends of the body 12 are front and rear supports 26,30 which stablise the pig when it is deployed in a pipeline. Each of the supports 26,30 comprises at least one annular member formed from a resilient rubber or plastics material. In the illustrated embodiment, the front support 26 includes a large diameter front sealing disc 27 which is mounted on the body 12 so as to abut the front mounting flange 14. The sealing disc 27 has a plurality of first fluid apertures and first fixing apertures intended to align with those apertures in the mounting flange 14. Mounted on the body 12 forward of the sealing disc 27 is a guide disc 28. The guide disc 28 has a smaller diameter but greater thickness than the sealing disc 27 and is consequently more resilient. Depending upon the application, the front support 26 may also include one or more spacer discs 29 mounted on the body 12 between the sealing disc 27 and the guide disc 28. As with the sealing disc 27, the guide disc 28 and, where present, the spacer discs 29 also have the plurality of first fluid and first fixing apertures which align with those of the mounting flange 14.

A front end cap 34 fits onto the front end of the body 12 to hold the components of the front support 26 to the front mounting flange 14. The front end cap 34 is also provided with first fluid and first fixing apertures which align with those of the front mounting flange 14 and support 26. The aligned first fluid apertures and first fixing apertures in each of the front mounting flange 14, sealing disc 27, guide disc 28, spacer disc(s) 29 and front end cap 34 define a plurality of first fluid passages 18 and first fixing passages 20. A fixing bolt 35 extends through each of the first fixing passages 20 and is held in place by a fixing nut 36. The various components are thus secured to the body 12 and front mounting flange 14.

The rear support 30 is substantially identical to the front support 26. Thus, the rear support 30 includes at least one annular member and in the illustrated embodiment has a large diameter rear sealing disc 31 which is mounted on the body 12 so as to abut the rear mounting flange 16. The sealing disc 31 has a plurality of second fluid apertures and second fixing apertures intended to align with those apertures in the rear mounting flange 16. Mounted on the body 12 rearward of the sealing disc 31 is a guide disc 32. The guide disc 32 has a smaller diameter but greater thickness than the sealing disc 31 and is consequently more resilient. The rear support 30 may also include one or more spacer discs 33 mounted on the body 12 between the sealing disc 31 and the guide disc 32. As with the sealing disc 31, the guide disc 32 and, where present, the spacer discs 33 also have the plurality of second fluid and second fixing apertures which align with those of the mounting flange 16. A rear end cap 38 fits onto the rear end of the body 12 to hold the components of the rear support 30 to the rear mounting flange 16. The rear end cap 38 is also provided with second fluid and second fixing apertures which align with those of the rear mounting flange 16 and support 30.

The aligned second fluid apertures and second fixing apertures in each of the rear mounting flange 16, sealing disc 31, guide disc 32, spacer disc(s) 33 and rear end cap 38 define a plurality of second fluid passages 22 and second fixing passages 24. A fixing bolt 35 extends through each of the second fixing passages 24 and is held in place by a fixing nut 36. The various components are thus secured to the body 12 and rear mounting flange 16.

The first and second fluid passages 18,22 permit fluid flow from the upstream to the downstream sides of the respective front and rear supports 26,30.

The front end of the body 12 includes an annular chamber 39, into which a control button or actuator 118 from a hydraulic control circuit projects. The operation of the control button 118 and circuit will be described in more detail below. The rear end cap 38 also includes a projecting member, or trigger, 40 which extends rearwards from the pig 10. The trigger 40 is preferably cylindrical and is adapted to extend into the annular chamber 39 of an identical pig located immediately behind the present pig. In doing so, the trigger 40 is adapted to prevent the control button 118 from moving radially outwards when the trigger 40 is located in the chamber 39 of a following pig.

The pig 10 further comprises a launch valve 50, which can be seen best in FIGS. 1 and 3. The valve 50 includes a guide plate 52 and a base plate 54. Both plates 52,54 are generally annular and are mounted on the body 12 of the pig 10 so that they project in the radial direction from the body 12. The guide plate 52 is fixed to the body 12 so that there is no relative movement between the two. The guide plate 52 is also provided with a number of guide apertures circumferentially spaced around the plate 52.

Fixed to the base plate 54 are a number of elongate valve stems, or pistons, 56 which, when the plate 54 is mounted on the body, are generally parallel with the longitudinal axis L of the pig 10. The base plate 54 is mounted on the body 12 so that it may slide axially on the body 12 relative to the fixed guide plate 52. The valve stems 56 are circumferentially spaced around the base plate 54 at the same circumferential positions as the guide apertures in the guide plate 52. These circumferential positions also correspond with the positions of the first fluid passages 18 in the front support 26. As a result the valve stems 56 extend through the guide apertures in the guide plate towards the first fluid passages 18 when the two plates 52,54 are mounted on the body 12. The base plate 54 and valve stems 56 can axially slide on the body 12 relative to the guide plate 52.

It will be appreciated that during the assembly of the pig the valve 50 should be installed prior to one or both of the front and rear support 26,30. Once the guide plate 52 is fixed in position on the body 12 and the base plate 54 and associated valve stems 56 have been located in the guide apertures of the guide plate 52, a biasing means is placed over the free end of each valve stem 56. In the preferred embodiment illustrated, the biasing means are in the form of compression springs 58. Once the springs 58 are placed over each valve stem 56 a valve body 60 is attached to the end of each valve stem 56, thus sandwiching each spring 58 between its respective valve body 60 and the guide plate 52. Each valve body 60 has a diameter which is chosen so that it can achieve a sealing fit at the mouth of its respective first fluid passage 18. The springs 58 thus bias their respective valve bodies 60 towards a position where the valve bodies 60 close the respective first fluid passages 18 in the front support 26.

Inside the body 12 of the pig 10 is a control means which controls the operation of the valve 50, and which in the preferred embodiment is hydraulic. The control means is best seen in FIGS. 4 and 5. FIG. 4 shows a vertical section through the body 12 depicting the various components of the control means with the external components of the pig removed for clarity. FIGS. 5(a)-(c) schematically show certain stages in the operation of the control means.

The control means comprises a control circuit and a locking member, or piston, 100 actuated by the control circuit. The locking piston 100 is slidingly located in a piston housing 102 within the pig body 12 so that the piston 100 can slide transversely relative to the longitudinal axis L of the body 12. In FIG. 4 the piston 100 is shown in its locking position, in which a free end 101 of the piston 100 is projecting from the side of the body 12. In the position shown in FIG. 4, the free end 101 of the piston 100 prevents the base plate 54 and valve stems 56 from sliding under the force of the biasing springs 58 into the position where the first fluid passages 18 are closed.

The control circuit comprises an inlet passage 104 which is in fluid communication with the exterior of the pig body 12 via at least one small aperture or slot 106 in the side of the body 12. Hydraulic fluid can therefore pass in and out of the control circuit via this aperture 106. Branching off from the inlet passage 104 are two passages. The first of these is a compensator passage 108 which extends forwards through the pig body 12 and has a first section 110 which runs substantially parallel to the longitudinal axis L of the pig body 12. At the end of the first section 110 remote from the inlet passage 104 is a second section 112 of the compensator passage which turns back through 180 degrees on the first section 110 such that it becomes co-axial with the axis L. At the remote end of the second section 112 of the compensator passage 108 is a compensator 113. The compensator 113 is made up of a compensator chamber 114 and a compensator piston 116 located in the chamber 114. The compensator chamber 114 has a first end in fluid communication with the compensator passage 108 and a second end which is in fluid communication with the exterior of the pig body 12 via a regulating passage (not shown). The compensator piston 116 is located in the chamber 114 between the first and second ends and can slide axially within the chamber 114. The compensator 113 thus has a first side open to the compensator passage 108 and a second side open to the regulating passage and the exterior of the pig body 12. In this way, the compensator 113 can compensate the control circuit for changes in hydraulic pressure inside and outside the pig body 12.

Located in the second section 112 of the compensator passage 108 is a control valve (not shown in FIG. 4). The control valve can selectively move between a first position in which it allows fluid to pass in and out of the compensator 113, and a second position in which fluid may only pass out of the compensator into the compensator passage 108. The position of the control valve is dictated by a control button 118 located at the front end of the pig body 12. The control button 118 is located in a recess 120 within the pig body 12 and is adapted to slide in the recess 120 in a direction transverse to the longitudinal axis L. Located in the recess 120 between the body 12 and button 118 is a biasing spring (not shown in FIG. 4) which biases the control button 118 outwards in which the control valve will assume the second position. The control button 118 is located at the front of the body 12 so that it will be pushed into the body when the pig 10 is positioned in a pig trap behind another identical pig. As seen in FIGS. 1 and 3, the pig 10 has a trigger 40 extending from the rear thereof. When the pigs are positioned in-line with one another, the trigger 40 of the leading pig will locate over, and press down upon, the control button 118 of the following pig. As explained above, when the control button 118 is pressed down into the recess 120 the control valve is in its first position.

The second passage to branch off from the inlet passage 104 is an accumulator passage 122. The accumulator passage 122 has a first end in fluid communication with the inlet passage 104 and a second end in fluid communication with an accumulator 124. The accumulator 124 comprises an accumulator chamber 126 and an accumulator piston 128 which can axially slide within the chamber 126. The piston 128 separates the accumulator chamber 126 into two sections: a first section in fluid communication with the accumulator passage 122, and an enclosed second section on the opposite side of the piston 128. The second section of the chamber 126 contains a volume of compressed gas and the relative volumes of the two sections of the chamber 126 will vary depending on the position of the piston 128. In FIG. 4, the piston 128 is shown in an initial position where the volume of the first section is effectively zero.

The locking piston 100 is partially located in the accumulator passage 122 intermediate the first and second ends thereof. The piston has a first portion upon which the free end 101 is formed, and a second portion remote from the free end which has a larger diameter than the first portion. Due to the variation in the diameter of the two portions, a shoulder 130 is formed at the point where the two portions of the piston 100 meet. A channel is formed on the outside of the second portion of the piston 100 such that when the piston 100 is located in the piston housing 102, the channel and the adjacent portion of the housing 102 define an actuation chamber 132 which is in fluid communication with the accumulator passage 122. In the initial position of the piston 100 shown in FIG. 4, the piston shoulder 130 rests against a seat 134 provided in the piston housing 102. When in this initial position, fluid can pass from the accumulator passage 122 through the actuation chamber 134 into the accumulator 124.

The manner in which the pig 10 is launched will now be described with reference to FIGS. 5(a)-(c). FIG. 5(a) shows the initial position of various components of the control means when the pig 10 is loaded into a pig trap behind an identical pig. With the two pigs in the correct position, the trigger 40' of the lead pig is pressing on the control button 118, which holds the control valve 140 in the first position. As a result, hydraulic fluid in the pig trap can enter the control circuit via inlet 104 and the compensator 113 can compensate the pressure in the circuit dependant on the pressure outside the pig. At the same time, fluid in the circuit can also enter the accumulator 124. When the locking piston 100 is in its initial position its free end 101 protrudes from the pig body to lock the base plate 54 and prevent the valve stems 56 from closing the first fluid passages. Hydraulic fluid can therefore pass through both the front and rear supports 26,30 via their respective first and second fluid passages 18,22 and build pressure against the lead pig. The valve of the first pig will have closed its first fluid passages due to there being not being another pig in front of the lead pig to lock the valve means open.

FIG. 5(b) shows the second stage in the launch procedure when the lead pig has itself been launched from the trap. As a result of the lead pig launching, its trigger 40' is no longer acting upon the control button 118 of the pig in the figures. Consequently, the control valve 140 has moved into the second position under the action of its spring 142. With the control valve 140 in its second position, hydraulic fluid can no longer enter the compensator 113, but fluid can exit the compensator 113 back into the control circuit. This effectively seals the hydraulic pressure into the control circuit, and the incoming hydraulic fluid is directed into the accumulator 124.

FIG. 5(c) shows the final stage in the launch procedure. Up until this point, the pressures inside and outside the pig have been substantially equal. However, at this point the external pressure drops, either due to the isolation or venting of the pig trap, or else due to a variation in the pipeline pressure. As a result of this drop in external pressure, the high pressure locked in the control circuit and the accumulator 124 is released. Given the comparatively small dimensions of the inlet 104 the majority of the high pressure fluid released from the accumulator 124 can only flow into the actuation chamber 132 of the locking piston 100. The large increase in hydraulic pressure in the actuation chamber 132 lifts the locking piston 100 from its seat in the piston housing, thereby moving the free end 101 of the piston 100 out of contact with the base plate 54 of the valve means.

Referring back to FIGS. 1 and 3, once the guide plate 54 has been released by the locking piston 100 the biasing springs 58 push the valve stems 56 and valve bodies 60 towards the first fluid passages 18 in the front support 26. Once the valve bodies 60 contact the front mounting flange 14 they close the first fluid passages 18. The hydraulic pressure outside the pig will then build as hydraulic fluid passes through the second fluid passages 22 in the rear support 30 but cannot bypass the front support 26. The hydraulic pressure will build against the front support 26 until such time as the pressure is sufficient to launch the pig out of the trap. Once the pig has passed through the pipeline it can be manually reset to the state shown in FIGS. 1 and 3 ready to be reused.

FIGS. 6 and 7 show the components of a launch trap which is suitable for launching the aforementioned pigs as well as other types of pipeline pig. FIG. 6 shows a pig cassette 150 which is adapted to receive a number of pigs in an in-line arrangement therein. The cassette 150 is generally cylindrical and has first and second ends 152,154. On the exterior of the first end 152 is an external seal 156. Attached to the second end of the cassette 150 is a loading plate 158. Although the cassette is shown empty in FIG. 6, the loading plate 158 is attached to the cassette 150 once the pigs have been loaded into the cassette. First and second sets of fluid ports 160,162 are provided adjacent the respective first and second ends of the cassette 150. These fluid ports 160,162 permit fluid communication between the exterior and the interior of the cassette 150. The first set of ports 160 has a larger number of ports than the second set 162. In the preferred embodiment illustrated, the first set of ports 160 has three times as many ports as the second set 162. Both sets of ports 160,162 are located atop the cassette 150 with the outermost ports of each set 160,162 being a maximum of 30° either side of the vertical. Consequently, each set of ports 160,162 is located within a 60° angle atop the cassette 150. The cassette 150 also includes a plurality of plugs 164 which may be inserted in one or more of the first and/or second sets of ports 160,162. By selectively blocking off one or more of each set of ports 160,162 with the plugs 164 the fluid flowrate from the exterior to the interior of the cassette 150 can be varied.

FIG. 7 shows a pig launch trap, generally designated 200, which incorporates the cassette 150 illustrated in FIG. 6. The trap 200 has part of its outer wall removed in FIG. 7 for illustrative purposes. The trap 200 includes an elongate body 202 having a first end 204 which is connected to a pipeline, and a second end 206 having a sealable loading door 208 attached thereto. Adjacent the second end 206 of the trap 200 is an inlet (not shown) for receiving a pressurised fluid from a suitable source. The body 202 has an internal diameter which is larger than that of the cassette 150. Consequently, a volume of free space 210 is defined between the exterior of the cassette 150 and the interior of the body 202 when the cassette is loaded into the body 202. The fluid ports 160,162 in the cassette 150 permit fluid communication between the free space 210 and the interior of the cassette 150. The first end 204 of the body 202 tapers inwards to a diameter which is less than that of the first end 152 of the cassette. As a result, when the cassette 150 is loaded into the body the external seal 156 at its first end 152 will come into contact with the inwardly tapering first end 204 of the trap body 202, thereby forming a sealing fit between the respective first ends 152,204 of the cassette 150 and the body 202. Fluid can therefore only flow out of the trap 202 after having passed through the fluid ports 160,162.

To launch pigs from the trap, a set of pigs is first introduced into the second end 154 of the cassette 150. Where pigs of the type described above are used the pigs 10 are arranged in line behind one another such that the trigger 40 of each pig 10 holds down the control button 118 of the pig immediately behind, in the manner described above. Once the pigs 10 are arranged correctly in the cassette 150, the loading plate 158 is fitted in the second end 154 of the cassette 150, thereby sealing the cassette 150. The door 208 in the second end 206 of the launch trap 200 is opened and the cassette 150 and pigs are loaded into the interior of the trap 200 until the seal 156 of the cassette 150 engages with the tapering internal wall of the trap's first end 204. Once the cassette 150 is in the correct position, the door 208 is closed to seal the trap 200.

In order to launch each pig 10 in succession, fluid is introduced into the trap body 202 via the fluid inlet. The fluid will enter the free space 210 between the trap body 202 and the cassette 150 and from there will flow into the cassette 150 via the first and second sets of ports 160,162. With there being more ports in the first set 160 than in the second set 162, a pressure differential is created across the pigs in the cassette 150, which assists in the launching of the lead pig from the cassette 150. The manner in which the pigs themselves launch has already been described above with specific reference to FIGS. 4 and 5(a)-(c). The immediate launch of the following pigs in the cassette is prevented as the valve means of each of those pigs is locked in the open position.

Positioning the fluid passage(s) in the front support means allows the applicant to mount the associated valve means outside of the pig body. This allows the dimensions of the pig body to be reduced, thereby permitting the pig to be used in small diameter pipelines than has been possible to date with this type of sequentially auto-launching pig. Furthermore, using a hydraulic control circuit simplifies the operation of the valve means, as the hydraulic pressure in the pig trap is used to operate the control circuit. This is advantageous as it reduces the complexity of the system, with the manufacturing costs consequently reduced.

Whilst the optimal arrangement of the present invention is to have a number of first fluid passages in the front support means along with the same number of valve means, the invention is not limited to this arrangement and could operate effectively with one or more first fluid passages and associated valve means. Additionally, whilst the most suitable control means for the present invention utilises the hydraulic control circuit and mechanical locking member described herein, the invention is not limited to the use of these components alone. Mechanical, electro-mechanical or electronic control means could also be employed to control the valve means of the present invention, or indeed a combination of two or more of these control means.

Instead of being located in an annular chamber within the front end of the pig, the actuator for the control valve of the control circuit could project radially from the exterior of the front end. In this case, the diameter of the rear projecting member would be increased to fit over the front end of the pig in order to press upon the actuator. Again, whilst the actuation arrangement is preferably mechanical the present invention is not limited to such. For example, the actuation could be effected electronically based on signals from a location sensor housed in the front end of the pig.

The present invention is also not limited to the use of the launch valve of the preferred embodiment described above. Instead of valve bodies which are biased to mechanically slide into the closed position the launch valve may comprise, for example, a flap valve located in each respective first fluid passage. In this example the flap valves could be controlled by non-mechanical means such as an electronic control circuit adapted to close the valve(s) in response to changes in pressure inside and outside the pig, as indicated by appropriate sensors.

The ratio of the first and second ports in the launch cassette may be varied from there being more ports in the first set. The second set may have more ports than the first, or else each set may have the same number of ports. The plugs for the ports are preferred, but not essential to the operation of the launch trap.

These and other modifications and improvements may be incorporated without departing from the scope of the present invention.

The invention claimed is:

1. A pipeline pig comprising:
an elongate body having a longitudinal axis;
annular front and rear supports projecting radially from the elongate body, wherein each support has an upstream side and a downstream side, the front support forming therethrough at least one first fluid passage permitting fluid flow from the upstream side of the front support to the downstream side of the front support, and the rear support forming therethrough at least one second fluid passage permitting fluid flow from the upstream side of the rear support to the downstream side of the rear support, wherein the first fluid passage and the second fluid passage are positioned outside of the elongate body;
wherein the at least one first fluid passage includes a plurality of circumferentially spaced first fluid passages formed through the front support, outside of the elongate body, and radially offset from the longitudinal axis
a launch valve to move from an open position to a closed position to close the at least one first fluid passage, wherein the launch valve comprises:
a valve body and a biasing means for each respective first fluid passage;
an annular base member slidingly located on the exterior of the pig body, wherein each valve body is attached to the base member via a valve stem;
the valve body slidably engaged with the elongate pig body for moving from the open to the closed position;
the biasing means biasing the valve body towards the closed position; and
a control means to control the closing of the launch valve, wherein the control means comprises a locking member to lock the valve body in the open position against the force of the biasing means.

2. A pipeline pig according to claim 1, wherein the launch valve further includes an annular guide plate fixed to the exterior of the pig body, the guide plate including a plurality of circumferentially spaced guide apertures within which the valve stems are located.

3. A pipeline pig according to claim 2, wherein each biasing means is a compression spring located on the valve stem between the valve body and the guide plate.

4. A pipeline pig according to claim 1, wherein the control means is housed inside the body of the pig, wherein the locking member projects from the body to lock the valve in the open position.

5. A pipeline pig according to claim 4, wherein the control means further comprises a control circuit adapted to selectively actuate the locking member to release the valve body towards the closed position.

6. A pipeline pig according to claim 5, wherein the control circuit is a hydraulic control circuit housed in the body of the pig and in fluid communication with the exterior of the body.

7. A pipeline pig according to claim 6, wherein the hydraulic control circuit comprises a compensator, an accumulator and an actuating piston connected to the locking member;
wherein the compensator has a first side in fluid communication with the accumulator and a second side in fluid communication with the exterior of the body;
the circuit further comprising a control valve intermediate the first side of the compensator and the accumulator, the control valve operable between a first position in which fluid may flow in and out of the compensator, and a second position in which fluid may only flow out of the compensator; and
wherein the actuator piston is in fluid communication with the accumulator such that discharge of the accumulator will actuate the locking member to release the launch valve.

8. A pipeline pig according to claim 7, wherein the control valve includes an actuator projecting from a front end of the pig body, and the pig further comprises a projecting member projecting from a rear end of the pig body, such that when two of the pigs are arranged in-line the projecting member of the front pig acts upon the actuator of the rear pig to hold the control valve of the rear pig in the first position until the front pig has moved away.

9. A pipeline pig according to claim 8, wherein the actuator projects radially into an actuation chamber located in the front end of the pig body, and the projecting member is adapted to locate in the actuation chamber of an adjacent pig.

10. The pipeline pig of claim 1, wherein the launch valve is positioned exterior of the elongate body, and the control means is located inside of the elongate body.

* * * * *